United States Patent
Baxendell et al.

(10) Patent No.: US 9,792,793 B2
(45) Date of Patent: Oct. 17, 2017

(54) SMOKE DETECTOR

(71) Applicant: Kidde Technologies Inc., Wilson, NC (US)

(72) Inventors: Doug John Baxendell, Clayton, NC (US); Kenneth Frazer Bell, Raleigh, NC (US); Michael John Isaacson, Zebulon, NC (US); Travis Wayne Jett, Wilson, NC (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 112 days.

(21) Appl. No.: 14/797,500

(22) Filed: Jul. 13, 2015

(65) Prior Publication Data
US 2017/0018160 A1  Jan. 19, 2017

(51) Int. Cl.
| G08B 17/10 | (2006.01) |
| G08B 17/107 | (2006.01) |
| B64D 13/06 | (2006.01) |
| B64D 45/00 | (2006.01) |

(52) U.S. Cl.
CPC ............ *G08B 17/10* (2013.01); *B64D 45/00* (2013.01); *G08B 17/107* (2013.01); *B64D 2013/0614* (2013.01); *B64D 2045/009* (2013.01)

(58) Field of Classification Search
CPC .. G01N 33/0024; G01N 21/534; G01N 21/53; G08B 17/113; G08B 17/10; G08B 17/107; G01F 1/6842; G01F 1/66
USPC ....... 340/628, 629, 630, 578, 579, 584, 606; 250/573; 73/28.01, 31.02, 863.81
See application file for complete search history.

(56) References Cited

U.S. PATENT DOCUMENTS

| 2,464,211 | A |   | 3/1949 | Cahusac et al. |
| 4,099,065 | A | * | 7/1978 | Malinowski ......... G08B 17/107 250/574 |
| 4,478,048 | A | * | 10/1984 | Dills ....................... F24F 1/027 165/223 |
| 4,543,815 | A | * | 10/1985 | Troup .................. G01N 21/534 340/628 |
| 4,617,560 | A | * | 10/1986 | Gutmann ............... G08B 17/10 340/628 |
| 4,868,546 | A | * | 9/1989 | Dumbeck ........... G01N 33/0024 250/381 |
| 5,410,299 | A | * | 4/1995 | Hard ..................... G08B 17/113 126/299 R |

(Continued)

FOREIGN PATENT DOCUMENTS

| WO |   9742486 A1 | 11/1997 |
| WO | 2015036204 | 8/2014 |

OTHER PUBLICATIONS

European Search Report for European Application No. 16178964.9 dated Dec. 9, 2016.

*Primary Examiner* — Hoi Lau
(74) *Attorney, Agent, or Firm* — Carlson, Gaskey & Olds, P.C.

(57) ABSTRACT

This disclosure relates to a smoke detection system for an enclosed area. The smoke detection system comprising a housing having an inlet and an outlet. The smoke detection system also having a divider within the housing, wherein the housing includes a first compartment to receive air flow from the inlet, a turning portion configured to direct flow to a second compartment in communication with the outlet, and a sensor that senses smoke provided within the first compartment. A method is also disclosed.

16 Claims, 3 Drawing Sheets

(56) References Cited

U.S. PATENT DOCUMENTS

| | | | |
|---|---|---|---|
| 5,537,096 A | 7/1996 | Wagner | |
| 5,926,098 A * | 7/1999 | Wiemeyer | G08B 17/113 250/573 |
| 6,166,648 A * | 12/2000 | Wiemeyer | G08B 17/113 250/573 |
| 6,407,671 B1 * | 6/2002 | Mulvihill | G08B 17/10 340/628 |
| 7,508,313 B2 | 3/2009 | Cole | |
| 7,656,302 B2 * | 2/2010 | Lang | G08B 17/10 340/628 |
| 2004/0035184 A1 * | 2/2004 | Yamano | G08B 17/10 73/28.01 |
| 2005/0178539 A1 * | 8/2005 | Rotta | B64D 45/00 165/235 |
| 2006/0114112 A1 * | 6/2006 | Cole | G01N 21/53 340/630 |
| 2007/0024459 A1 * | 2/2007 | Cole | G01F 1/6842 340/630 |
| 2009/0025453 A1 * | 1/2009 | Griffith | G08B 17/113 73/31.02 |
| 2009/0237259 A1 * | 9/2009 | Yokota | G08B 17/113 340/628 |
| 2009/0237261 A1 * | 9/2009 | Yokota | G08B 17/10 340/628 |
| 2009/0241697 A1 * | 10/2009 | Kato | G08B 17/10 73/863.81 |
| 2012/0235822 A1 * | 9/2012 | Barson | G08B 17/107 340/630 |
| 2015/0253165 A1 * | 9/2015 | Ajay | G01F 1/66 73/28.01 |
| 2016/0086468 A1 * | 3/2016 | Calvert | G08B 17/10 340/628 |

* cited by examiner

SMOKE DETECTOR

BACKGROUND

The present disclosure relates to smoke detectors.

Smoke detectors are used in the detection of smoke inside an aircraft. In some examples, smoke detectors are used within an electronics bay, cargo bays, passenger cabins, landing gear bays, etc. Electronics bays contain avionics units, controllers, etc.

In typical aircraft, air is pressurized by compressors and delivered to an aircraft cabin. Some of the air is directed to other locations, such as to cool an electronics bay.

Samples of cooling air may then be directed to one or more detection systems. The detection systems are configured to recognize a fire threat by analyzing the air sample, and are further configured to trigger an alarm if smoke is present in the air sample. The detection system may be a photoelectric smoke detector, but other air sampling smoke detectors are known. Photoelectric smoke detectors detect a brightness variation by using light to determine whether smoke particles are present in the air sample. In some examples, the air flows through a pipe into the detection system and exits a downstream location.

One known type of smoke detector has a box-like housing with an inlet on one end, and an outlet on an opposite end. In these examples, the inlet and outlet are provided in a common plane (e.g., one is not vertically above or below the other).

SUMMARY

This disclosure relates to a smoke detection system for an enclosed area. The system includes a housing having an inlet and an outlet. A divider is positioned within the housing, wherein the housing includes a first compartment to receive air flow from the inlet, a turning portion configured to direct flow to a second compartment in communication with the outlet, and a sensor that senses smoke provided within the first compartment.

This disclosure further relates to a method for detecting smoke in an aircraft. In the method, air flow is directed into a first compartment of a housing in communication with an inlet. The first compartment has a sensor to detect smoke in the air flow. Further, the air flow is directed to a turning portion. The air flow is further passed to a second compartment in communication with an outlet. A divider separates the first and second compartments.

These and other features may be best understood from the following drawings and specification.

BRIEF DESCRIPTION OF THE DRAWINGS

The drawings that accompany the detailed description can be briefly described as follows.

DETAILED DESCRIPTION

Figure 1:
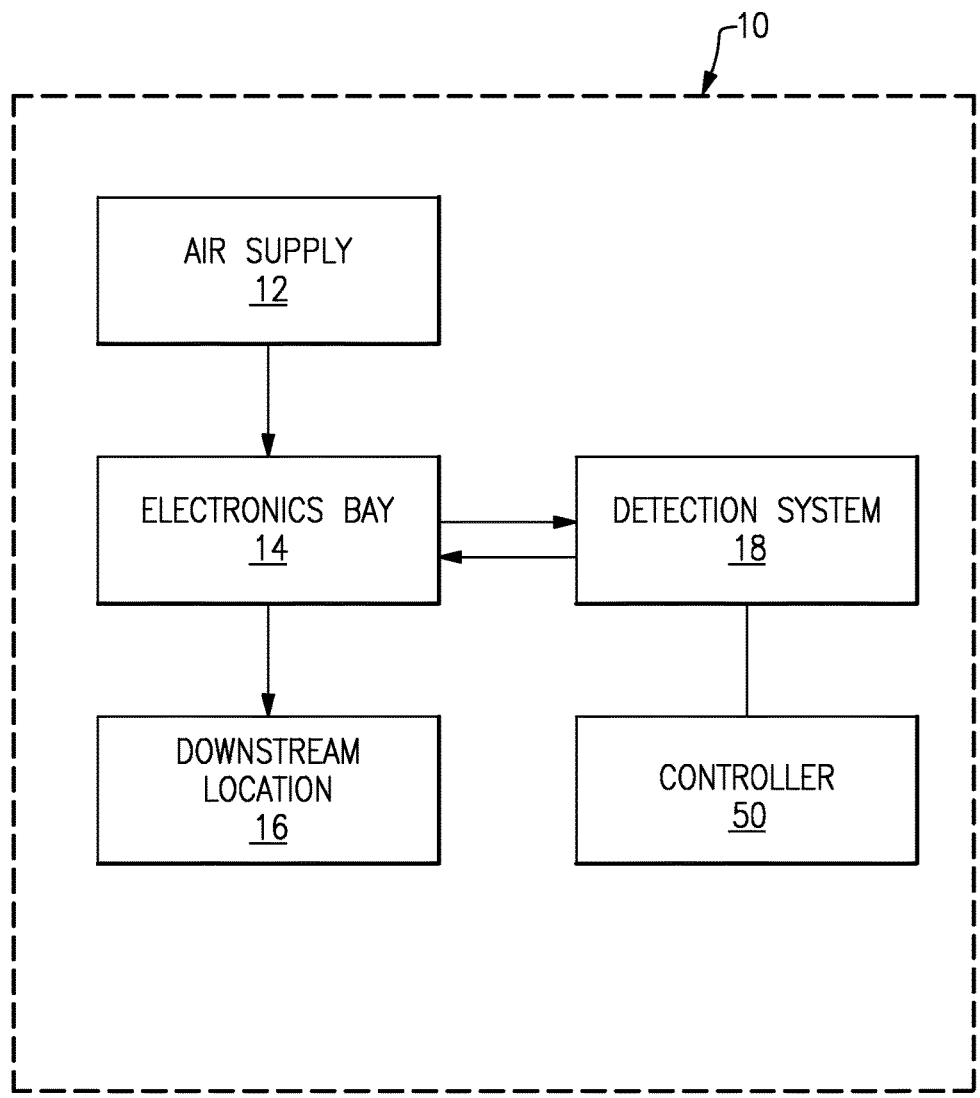
FIG. 1 is a highly schematic view of an aircraft.

FIG. 1 is a highly schematic view of an aircraft 10. A fire detection system 18 is used to recognize a fire threat by detecting the presence of smoke in an aircraft, for example. In addition to fire, the fire detection system 18 can more broadly detect temperature threats by detecting an increase in temperature in the aircraft, for example. It should be understood that the example system 18 is not limited to use with aircraft, and may alternatively be used in other applications.

In this example, the system 18 is implemented within the aircraft 10 to recognize fire threats that may occur in a confined space, such as an electronics bay 14. The system 18 may also be utilized in other locations in the aircraft 10 (e.g., a cargo bay, passenger cabin, etc.).

To prevent the electronics bay 14 from overheating, cooling air is directed from an air supply 12 to cool the electronics bay 14. In this example, a majority of the cooling air flows to the electronics bay 14. A portion of the air from the electronics bay 14 is tapped to a detection system 18. The detection system 18 is operable to detect the presence of smoke within the cooling air. Additionally, the detection system 18 may also be able to detect a temperature threat. Downstream of the detection system 18, the cooling air flows to a downstream location 16. An example air supply 12 includes a compressor that may also deliver air to an aircraft cabin. An example of a downstream location 16 is air flow back to the compressor.

Figure 2:
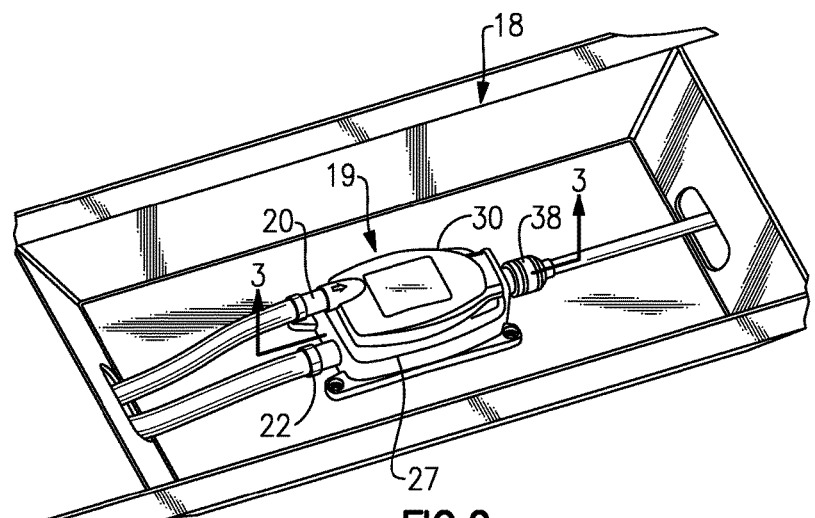
FIG. 2 is a top-perspective view of an example smoke detector unit.
Figure 3:
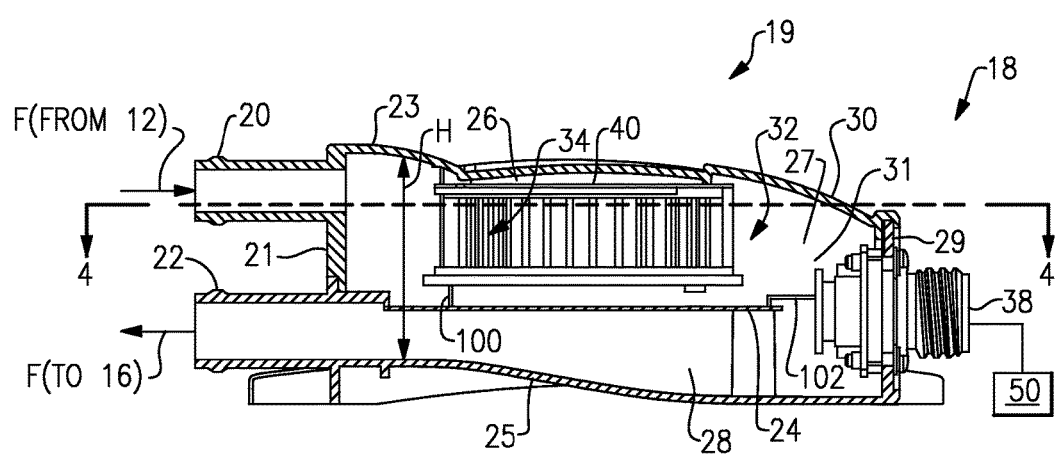
FIG. 3 is a cross-sectional view of the smoke detector unit taken along line 3-3.

FIG. 2 shows the detection system 18 having a detector unit 19. FIG. 3 is a cross-sectional view of the detector unit 19. With joint reference to FIGS. 2 and 3, a detector unit 19 has an exterior housing 30 defining an interior compartment 32. The exterior housing 30 has a front side 21, an upper side 23, a lower side 25, a rear side 29, and lateral sides 27. The interior compartment 32 has a first compartment 26 downstream of a detector inlet 20 and a second compartment 28 upstream of a detector outlet 22. Inlet 20 receives the tapped air from electronics bay 14 and outlet 22 returns the air to the bay 14. Compartments 26 and 28 are separated by a divider 24. In one example, the divider 24 is a circuit board to operate the detector unit 19.

In one example, the exterior housing 30 is formed of die cast aluminum. Die cast aluminum provides better bonding for the exterior housing 30 and is cost effective. Die cast aluminum also provides good electromagnetic interference resistance characteristics. Alternatively, the exterior housing 30 may be formed from other suitable materials.

A height H is defined across unit 19 with the first compartment 26 located on an opposite side of the divider 24 relative to the second compartment 28 in the height direction. The exterior housing 30 is formed of two pieces. In this example, a single piece provides the rear side 29, the lower side 25, and the detector outlet 22. Another piece provides the front side 21, lateral sides 27, the upper side 23, and the detector inlet 20. The two pieces are joined together to provide the exterior housing 30. Additionally, internal walls and baffles may be added to key areas in the first compartment 26 and the second compartment 28 to optimize flow and provide rigidity to the exterior housing 30.

The first compartment 26 is in fluid communication with detector inlet 20 and the second compartment 28 is in fluid communication with a detector outlet 22. The detector inlet 20 and the detector outlet 22 are located on a common first side, and an electrical connection 38 is located on a second side opposite the detector inlet 20 and detector outlet 22. In one example, the detector inlet 20 and the detector outlet 22 are located on the front side 21, with the electrical connection 38 located on the rear side 29.

By placing the electrical connection 38 on the opposite side of the detector inlet 20 and detector outlet 22, the detector unit 19 is more compact and has a reduced weight and volume. Further, providing the detector inlet 20 and the detector outlet 22 on the same side increases the ease of connecting air lines to the detector inlet 20 and detector outlet 22.

In one example, the detector inlet 20 has a first diameter and the detector outlet 22 has a second diameter different from the first diameter. In this way, the detector inlet 20 and the detector outlet 22 are prevented from being connected to fluid connections in reverse. Alternatively, the detector inlet 20 and the detector outlet 22 may both have diameters that are equal.

As can be appreciated, air flows into detector inlet 20, through the first compartment 26, and generally in a first direction. The air then turns through a turning portion 31 that turns the air through 180 degrees and downwardly into the second compartment 28. The air then flows in a second direction, generally opposed to the first direction, and to the detector outlet 22.

As further shown, somewhat schematically, a sensor unit 34 is connected to the circuit board 24 through a wire 100. This then communicates signals from the sensor 34, as will be described above, to the circuit board 24. From the circuit board 24, another wire 102 is shown communicating to a control 50 through electrical connection 38. Single wires 100 and 102 are shown. Of course, more wires may be included.

Figure 4:
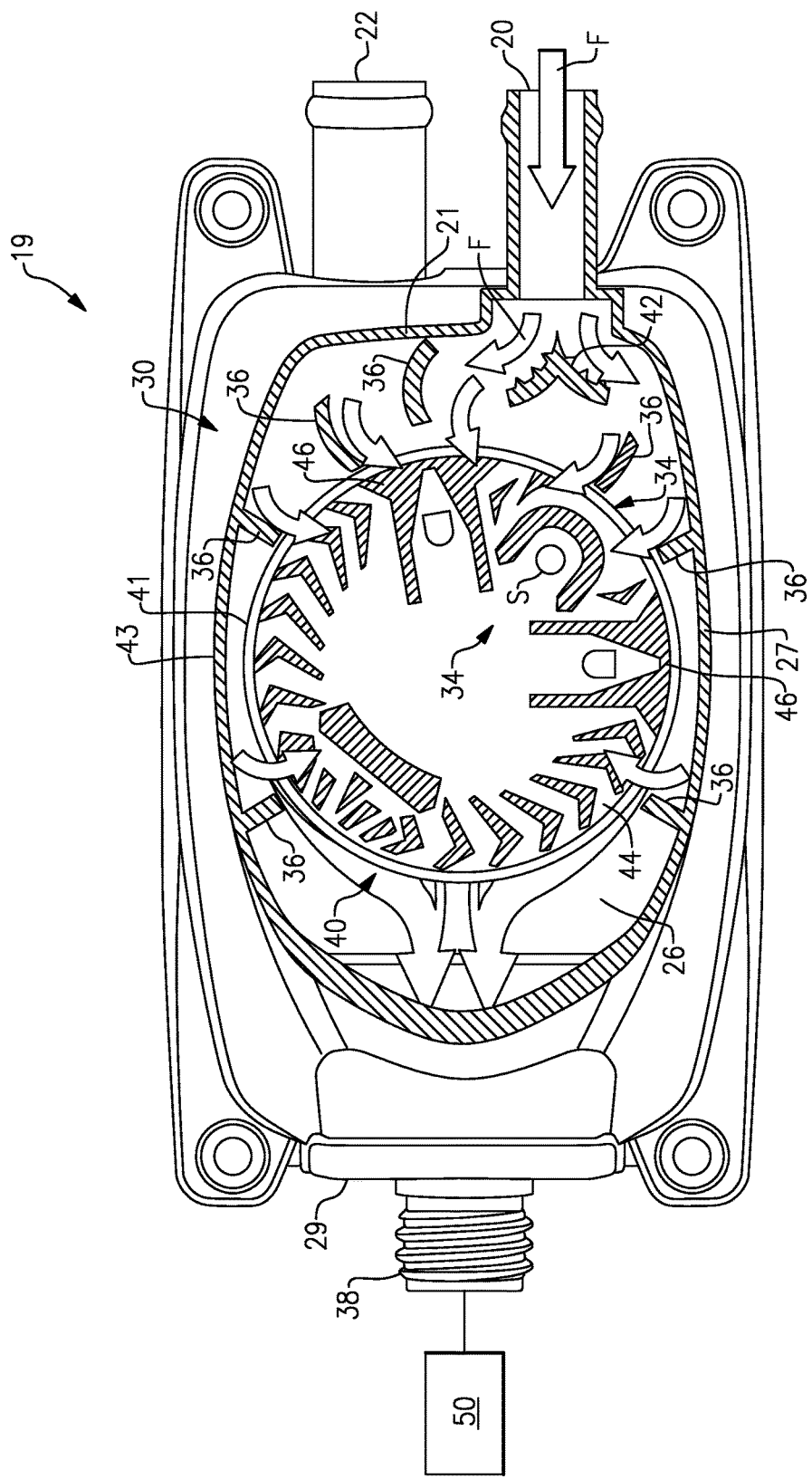
FIG. 4 is a cross-sectional view of the smoke detector unit taken along line 4-4.

FIG. 4 shows a cross-sectional view of the detector unit 19 taken along line 4-4 of FIG. 3. The detector inlet 20 receives air from the electronics bay 14. A splitter vane 42 is located downstream of the detector inlet 20. Sensor 34 is shown located in first compartment 26.

Thus, air entering the detector inlet 20 strikes splitter vanes 42, which can be seen to direct air in opposed directions. The air also then encounters turning vanes 36. The turning vanes 36 direct the air inwardly into a labyrinth 40.

Labyrinth 40 has labyrinth vanes 44. The labyrinth vanes 44 serve to direct air flow into the sensor unit 34, but they further serve to block light. In the particular type of sensor, ambient light would be undesirable as provided light is part of the testing system. The operation of the sensor is generally as known.

Still referring to FIG. 4, the air flow into the labyrinth 40 is then directed to sensor 34. Sensor 34 includes a sensing element S and light emitting diodes 46. In this example, the sensing element S includes hardware and software configured to detect smoke particles. Sensing element S is in communication with controller 50 of an engine, such as a FADEC, and is operable to report that smoke has been detected to that controller 50, such that an alarm, or fire abatement system, may be triggered. This communication may be through wire 100, circuit board 24 and wire 102.

In this example, light emitting diodes 46 are placed adjacent the sensing element S. The light emitting diodes 46 illuminate a sample of air F while a light receiving sensor provided by sensing element S scans the same sample of air for light. If light scattered by smoke particles in the air flow exceeds a predetermined threshold, indicating the presence of smoke, then the sensor 34 will signal an alarm through the controller 50. In other examples, the detector unit 19 does not have to utilize light refraction. Other types of sensors may be used. In other words, while an example detector is shown, other examples come within the scope of this disclosure.

Downstream of the sensor 34, the air passes through a turning portion 31 shown in FIG. 3 located between the first compartment 26 and the second compartment 28, in an opposite direction, back towards the front side 21 of the detector unit 19.

The labyrinth 40 as shown in FIG. 4 has a rounded perimeter 41. The lateral sides 27 surround the rounded perimeter 41 and are provided with a contour 43 being substantially shaped to follow the rounded perimeter 41, helping to guide air flow towards the sensor 34. As illustrated in FIG. 3, the upper side 23 has a rounded shape and is widest at a midpoint between the front side 21 and the rear side 29, forming essentially an egg shape. In the same example, the lower side 25 (e.g., in the dimension between the divider 24 and the lower side 25) narrows at it nears the detector outlet 22. The design of the exterior housing 30 of the detector unit 19 is optimized to minimize the pressure drop between the detector inlet 20 and the detector outlet 22, enhancing overall smoke detection.

In sum, a smoke detection system 19 has a housing 30 having an inlet 20 and an outlet 22. A divider 24 is within the housing 30. The housing 30 includes a first compartment 26 to receive air flow from the inlet, and a turning portion 31 configured to direct flow to a second compartment 28 in communication with the outlet 22. A sensor 34 is configured to sense smoke in an air sample, and is provided within the first compartment 26.

A method for detecting smoke in an aircraft may be said to include the steps of directing air flow into a first compartment 26 of a housing 30 in communication with an inlet. The first compartment 26 has a sensor 34 to sense smoke and detect smoke in the air flow. Directing the air flow to a turning portion 31 and passing the air flow to a second compartment 28 in communication with an outlet 22. A divider 24 separates the first and second compartments.

The term "substantially" is interpreted consistent with the definition "for the most part" and specification does not provide a standard for measuring the precise boundaries of that term of degree. However, the term should be interpreted in the way one skilled in the art would interpret the term.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A smoke detection system for an enclosed area, the system comprising:
    a housing having an inlet and an outlet;
    a divider within the housing, wherein the housing includes a first compartment to receive air flow from the inlet, and a turning portion configured to direct flow to a second compartment in communication with the outlet; and
    a sensor configured to detect smoke in an air flow, said sensor provided within the first compartment;
    wherein the first compartment is in communication with the inlet, the second compartment is in communication with the outlet, and the inlet and outlet are provided in a common side of the housing; and
    wherein the first compartment receives air flow from the inlet in a first direction and the second compartment returns air flow to the outlet in a second direction opposite to the first direction, wherein air flows in the first direction downstream of the sensor and upstream of the turning portion.

2. The system as recited in claim 1, wherein an electrical connection is provided in a side opposite the common side.

3. The system as set forth in claim 2, wherein a wire extends from said sensor to a circuit board.

4. The system as set forth in claim 3, wherein a wire extends from said circuit board outwardly of said electrical connection to a controller.

5. The system as recited in claim 1, wherein the inlet has a first diameter and the outlet has a second diameter different than the first diameter.

6. The system as recited in claim 1, wherein the first compartment includes splitter vanes to split the air flow adjacent the inlet.

7. The system as recited in claim 6, wherein the housing includes turning vanes that turn the air flow towards the sensor.

8. The system as recited in claim 1, wherein the divider is a circuit board electrically controlling the sensor.

9. A method for detecting smoke in an aircraft, the method comprising:
   (a) directing air flow into a first compartment of a housing in communication with an inlet, the first compartment having a sensor to detect smoke in the air flow, wherein the air flows into the first compartment in a first direction, and wherein, downstream of the sensor, the air flows in the first direction;
   (b) directing the air flow to a turning portion, wherein the air flows in the first direction upstream of the turning portion; and
   (c) passing the air flow to a second compartment in communication with an outlet, wherein a divider separates the first and second compartments, and wherein the air flows from the second compartment to the outlet in a second direction opposite the first direction.

10. The method as recited in claim 9, further comprising: controlling the sensor with a circuit board electrically coupled to the sensor, the circuit board providing the divider.

11. The method as recited in claim 9, further comprising: splitting the air flow in the first compartment with splitter vanes adjacent the inlet.

12. The method as recited in claim 11, further comprising: turning the air flow towards the sensor with turning vanes adjacent the splitter vanes.

13. A smoke detection system for an enclosed area, the system comprising:
    a housing having an inlet and an outlet;
    a divider within the housing, wherein the housing includes a first compartment to receive air flow from the inlet, and a turning portion configured to direct flow to a second compartment in communication with the outlet; and
    a sensor configured to sense smoke in an air flow, said sensor provided within the first compartment, wherein the first compartment includes splitter vanes to split the air flow adjacent the inlet, and wherein the housing includes turning vanes that turn the air flow towards the sensor; and
    wherein the first compartment receives air flow from the inlet in a first direction and the second compartment returns air flow to the outlet in a second direction opposite to the first direction, wherein the air flows in the first direction downstream of the sensor and upstream of the turning portion.

14. The system as set forth in claim 13, wherein a wire extends from said sensor to a circuit board.

15. The system as recited in claim 13, wherein the divider is a circuit board electrically controlling the sensor.

16. The system as recited in claim 13, wherein the first compartment is in communication with the inlet, the second compartment is in communication with the outlet, and the inlet and outlet are provided in a common side of the housing.

* * * * *